US012811630B2

(12) United States Patent
Mouhouche

(10) Patent No.: US 12,811,630 B2
(45) Date of Patent: Nov. 24, 2026

(54) METHOD AND APPARATUS FOR HARQ COMBINING IN A MOBILE COMMUNICATION SYSTEM

(71) Applicant: SAMSUNG ELECTRONICS CO., LTD., Suwon-si (KR)

(72) Inventor: Belkacem Mouhouche, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 342 days.

(21) Appl. No.: 18/684,144

(22) PCT Filed: Aug. 18, 2022

(86) PCT No.: PCT/KR2022/012323
§ 371 (c)(1),
(2) Date: Feb. 15, 2024

(87) PCT Pub. No.: WO2023/022533
PCT Pub. Date: Feb. 23, 2023

(65) Prior Publication Data

US 2025/0023602 A1 Jan. 16, 2025

(30) Foreign Application Priority Data

Aug. 18, 2021 (GB) ...................................... 2111862

(51) Int. Cl.
*H04B 7/0408* (2017.01)
*H04L 5/00* (2006.01)
*H04W 72/044* (2023.01)

(52) U.S. Cl.
CPC ......... *H04B 7/0408* (2013.01); *H04L 5/0055* (2013.01); *H04W 72/046* (2013.01)

(58) Field of Classification Search
CPC ... H04B 7/0408; H04L 5/0055; H04L 1/1893; H04L 1/189; H04L 1/1845; H04L 1/18; H04W 72/046
See application file for complete search history.

(56) References Cited

U.S. PATENT DOCUMENTS 11,444,681 B2 9/2022 Jung et al.
2016/0366687 A1 12/2016 Guo et al.
(Continued)

FOREIGN PATENT DOCUMENTS

WO 2018136227 A1 7/2018
WO 2018149583 A1 8/2018
(Continued)

OTHER PUBLICATIONS

International Search Report and Written Opinion of the International Searching Authority dated Nov. 23, 2022, in connection with International Application No. PCT/KR2022/012323, 7 pages.
(Continued)

*Primary Examiner* — Hashim S Bhatti

(57) ABSTRACT

The disclosure relates to a 5G or 6G communication system for supporting a higher data transmission rate. Disclosed is a method of performing multicast transmission in a telecommunication system comprising: a base station, gNB, transmitting a message to a plurality of User Equipments, UEs, on a plurality of beams from the base station; one of the plurality of UEs receiving the message via a main beam and one or more additional beams; the one of the plurality of UEs combining the messages received via the main beam and the one or more additional beams and decoding the message.

12 Claims, 4 Drawing Sheets

(56) References Cited

U.S. PATENT DOCUMENTS

| | | | | |
|---|---|---|---|---|
| 2017/0150342 | A1* | 5/2017 | Slater | H04W 8/087 |
| 2019/0342047 | A1 | 11/2019 | Kim et al. | |
| 2020/0169896 | A1 | 5/2020 | Li et al. | |
| 2020/0403738 | A1 | 12/2020 | Zhou et al. | |
| 2021/0194561 | A1* | 6/2021 | Bai | H04W 16/28 |

FOREIGN PATENT DOCUMENTS

| | | | |
|---|---|---|---|
| WO | 2019172683 | A1 | 9/2019 |
| WO | 2020227131 | A1 | 11/2020 |
| WO | 2021026550 | A1 | 2/2021 |
| WO | 2021147073 | A1 | 7/2021 |

OTHER PUBLICATIONS

Combined Search and Examination Report dated Feb. 14, 2022, in connection with United Kingdom Patent Application No. GB2111862.5, 8 pages.

SA WG2, "Revised SID: Architectural enhancements for 5G multicast-broadcast services," 3GPP TSG SA Meeting #85, SP-190625 (revision of SP-190442), Sep. 2019, Newport Beach, USA, 4 pages.

Samsung, "Support of group scheduling for RRC_Connected UEs," 3GPP TSG RAN WG1 #105, R1-2105336, e-Meeting, May 2021, 5 pages.

Huawei et al., "New WID: Architectural enhancements for 5G multicast-broadcast services," TSG SA Meeting #SP-90E e-meeting, SP-201106 (revision of SP-200974), Elbonia, Dec. 2020, 4 pages.

Huawei, "New Work Item on NR support of Multicast and Broadcast Services," 3GPP TSG RAN Meeting #86 RP-193248 (revision of RP-193163), Sitges, Spain, Dec. 2019, 5 pages.

3GPP TS 22.261 V16.3.0 (Mar. 2018) Technical Specification; 3rd Generation Partnership Project; Technical Specification Group Services and System Aspects; Service requirements for the 5G system; Stage 1 (Release 16); 54 pages.

3GPP TR 23.757 V17.0.0 (Mar. 2021) Technical Report; 3rd Generation Partnership Project; Technical Specification Group Services and System Aspects; Study on architectural enhancements for 5G multicast-broadcast services (Release 17); 298 pages.

3GPP TR 38.913 V14.3.0 (Jun. 2017) Technical Report; 3rd Generation Partnership Project; Technical Specification Group Radio Access Network; Study on Scenarios and Requirements for Next Generation Access Technologies; (Release 14); 39 pages.

* cited by examiner

[Fig. 1]
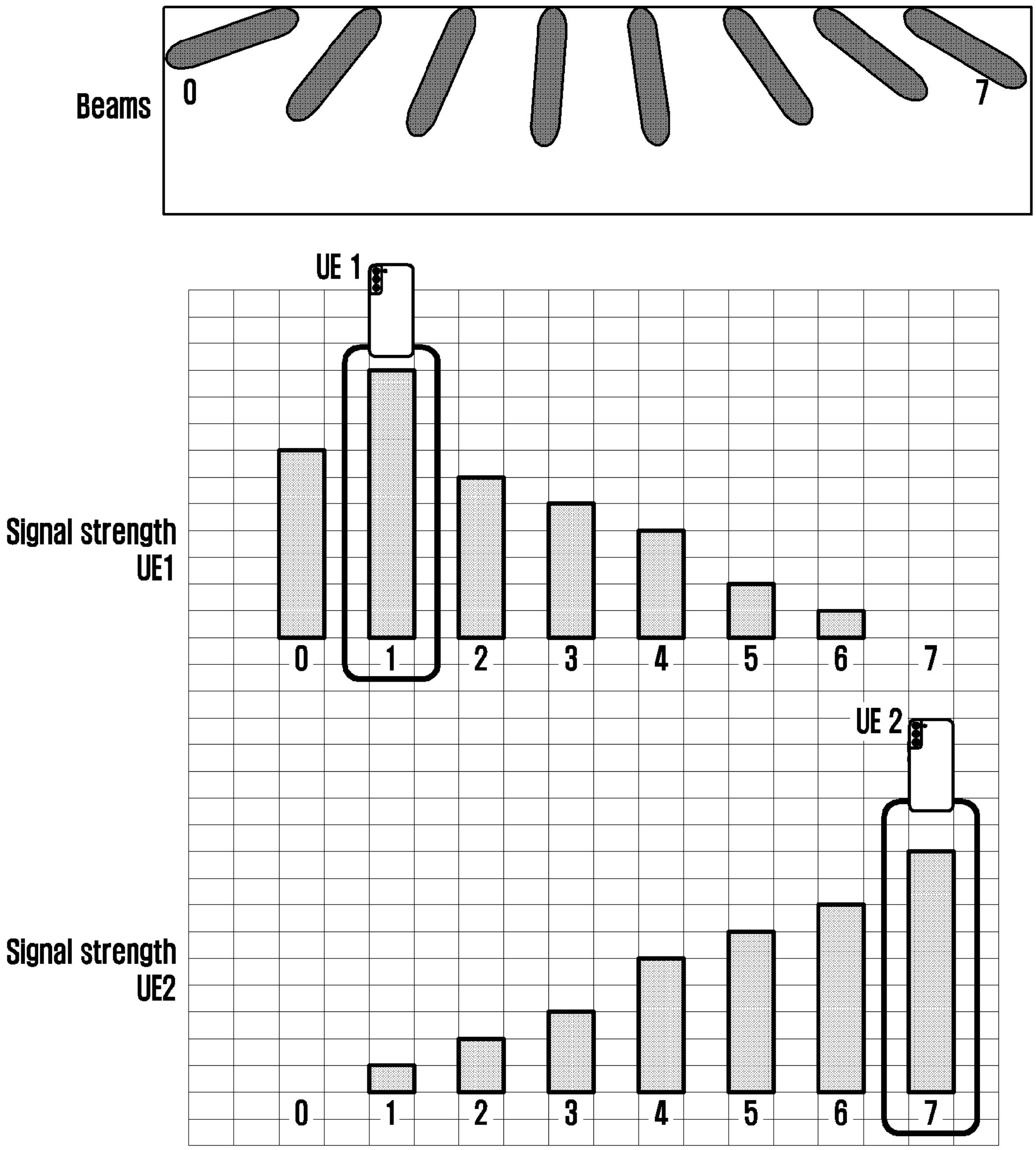

[Fig. 2]
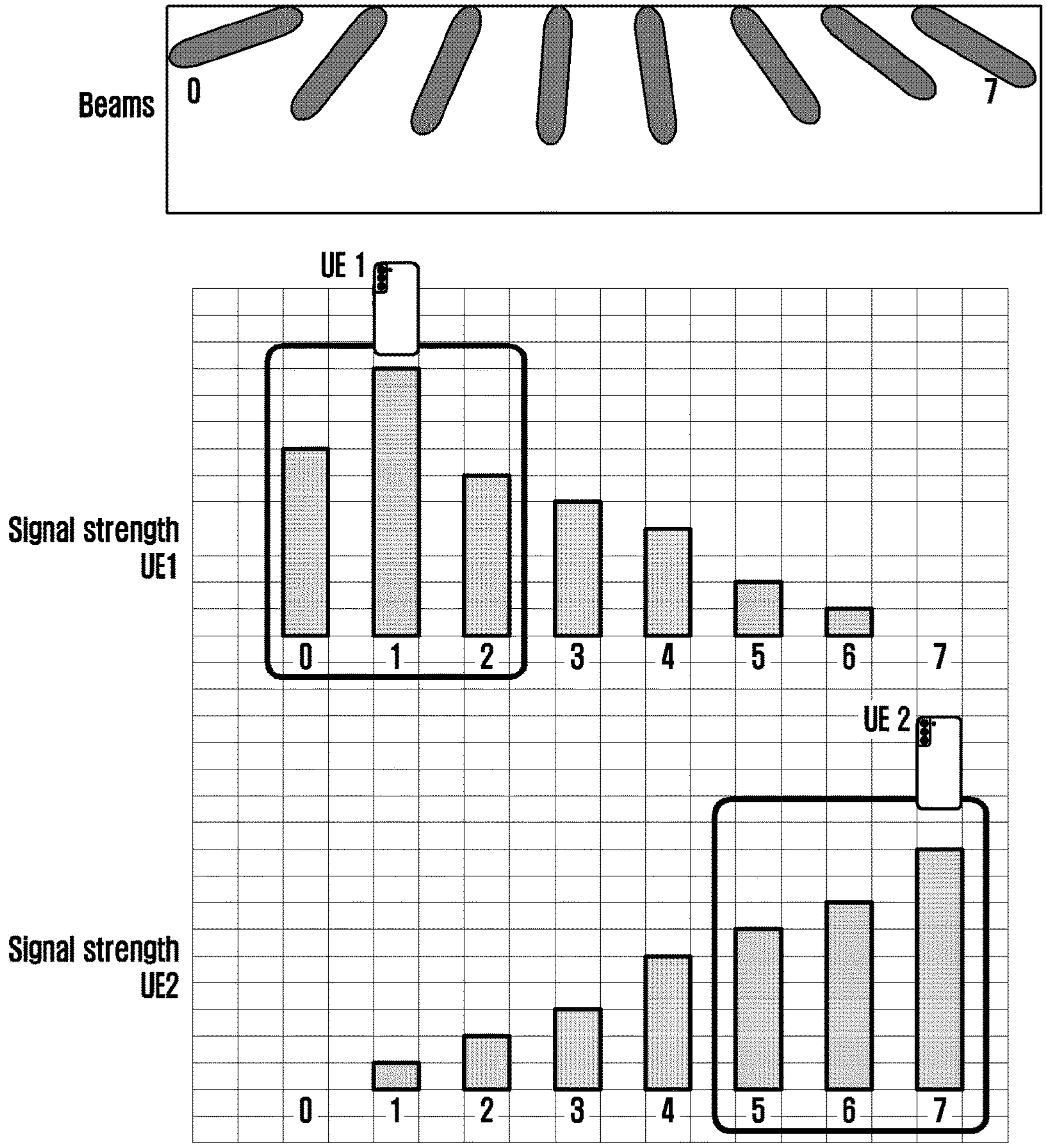
[Fig. 3]
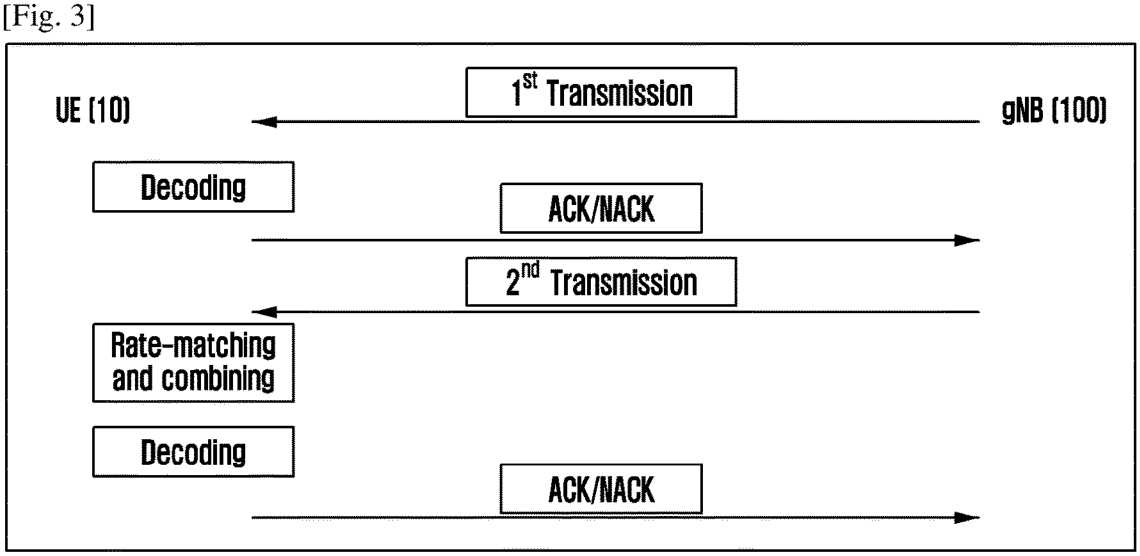

[Fig. 4]
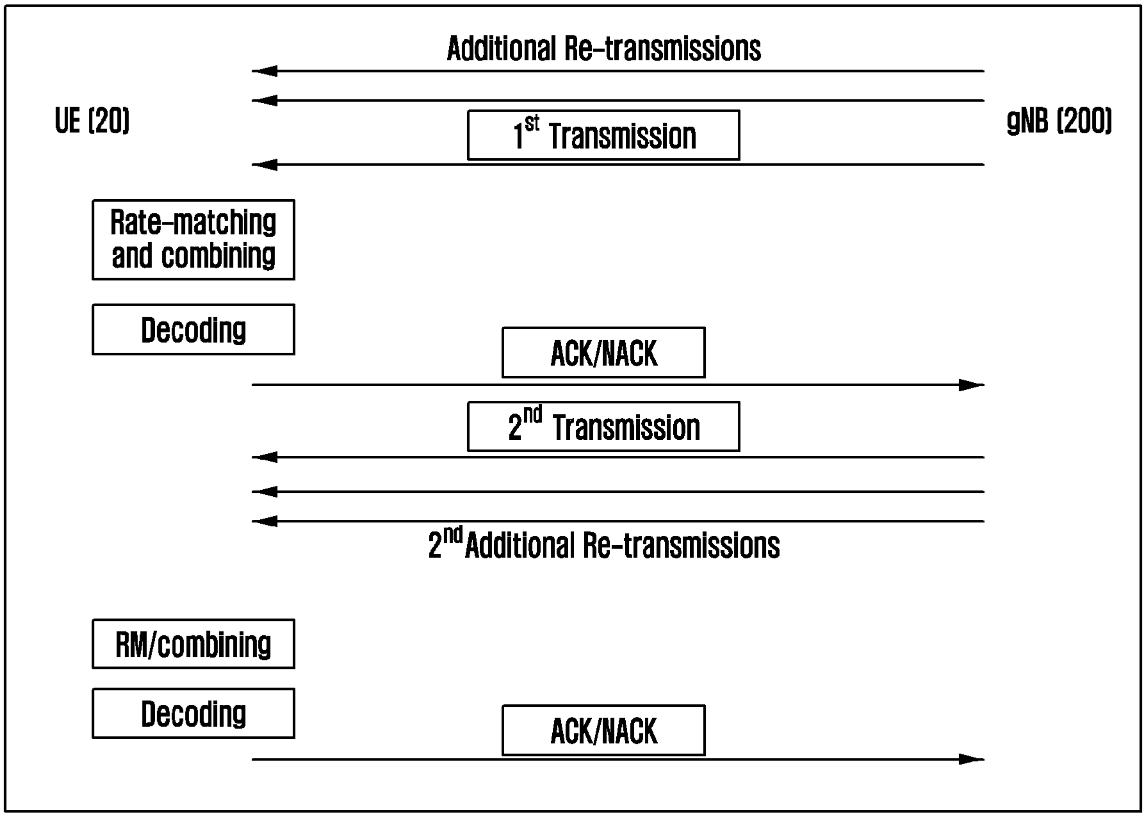
[Fig. 5]
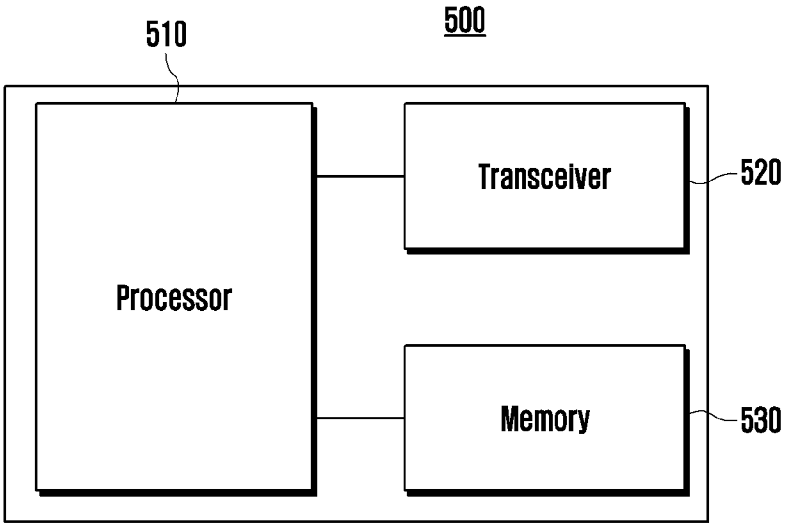

[Fig. 6]
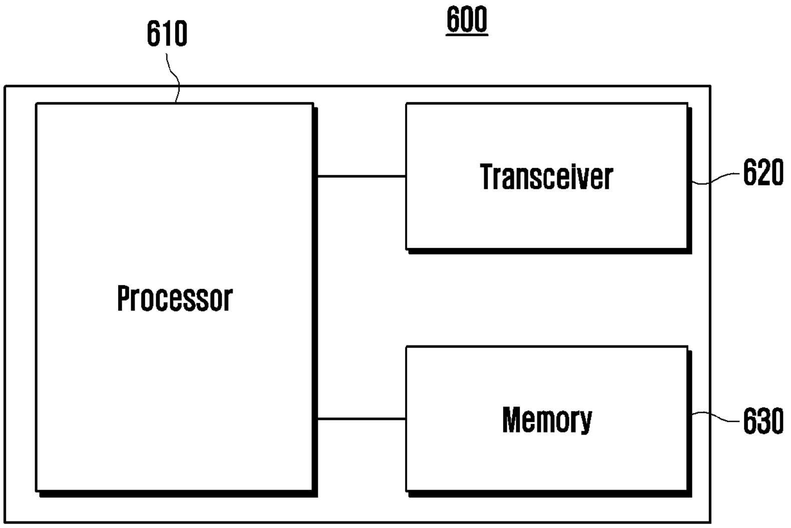

METHOD AND APPARATUS FOR HARQ COMBINING IN A MOBILE COMMUNICATION SYSTEM

TECHNICAL FIELD

The present invention relates to improvements in multi-beam multicast techniques particularly, but not exclusively in Fifth Generation (5G) telecommunication systems.

BACKGROUND ART

There are essentially two modes of transmission in wireless communication systems: point to point and point to multipoint. Point-to-multipoint transmission is more efficient compared to point-to-point whenever a service or an application requires the same content to be delivered to multiple users or devices at the same time. As such, point to multipoint is considered to be an important feature for 5G applications in a number of vertical sectors, namely Media & Entertainment (M&E), Public Warning (PW), Automotive (Auto) and Internet of Things (IoT). For these use cases, the number of served UEs would typically be too large to be supported using point to point transmissions.

Point to multipoint transmissions may be further split into two categories: Multicast—where the base station is aware of the mobiles that receive the service because of prior expression of interest following a service announcement; and Broadcast—where the base station transmits a service that can be received by a plurality of User Equipments (UEs), some of which have not expressed interest. In the Broadcast case, there is typically no feedback route by which the receiving UE is able to indicate successful/unsuccessful reception.

5G Multicast and Broadcast Services (5G MBS) is being standardised in Release 17 (Rel-17) of the applicable standard, where mechanisms to improve the reliability of point to multipoint transmissions are studied. One such mechanisms is the use of retransmissions. This is the first time that this has been considered for Broadcast and Multicast. Previously, Broadcast and Multicast were always transmitted without any feedback from the UE. This means that the base station was required to tailor the broadcast service to suit the weakest link that is interested in the service in the hope that this would ensure a suitable user experience for all interested UEs.

5G mobile communication technologies define broad frequency bands such that high transmission rates and new services are possible, and can be implemented not only in "Sub 6 GHz" bands such as 3.5 GHz, but also in "Above 6 GHZ" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service arca expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also fullduplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultrahigh-performance communication and computing resources.

DISCLOSURE OF INVENTION

Technical Problem

There are many issues regarding the use of multicast transmission in the 5G telecommunication system. The present invention has been made to provide at least the advantages described below. For more enhanced communication system, there is a need for improving reliability of point-to-multipoint transmission.

Solution to Problem

In accordance with an embodiment, a method performed by a user equipment (UE) in a communication system is provided. The method includes receiving, from a base station, a first additional re-transmission for a message, the first additional retransmission being associated with at least one additional beam other than a main beam for the terminal; receiving, from the base station, a first transmission for the message, the first transmission being associated with the main beam for the terminal; identifying whether a decoding of the message is successful based on the first additional retransmission and the first transmission; and in case that the decoding of the message is unsuccessful, transmitting, to the base station, a NACK message.

In accordance with an embodiment, a method performed by a node entity in a communication system is provided. The method includes transmitting, a first additional retransmission for a message, the first additional re-transmission being associated with at least one additional beam other than a main beam for the terminal; transmitting, a first transmission for the message, the first transmission being associated with the main beam for the terminal; in case that the decoding of the message is unsuccessful, receiving a NACK message.

In accordance with an embodiment, a UE in a communication system is provided. The UE includes a transceiver and at least one processor. The at least one processor is configured to receive, from a base station, a first additional re-transmission for a message, the first additional re-transmission being associated with at least one additional beam other than a main beam for the terminal, receive, from the base station, a first transmission for the message, the first transmission being associated with the main beam for the terminal, identify whether a decoding of the message is successful based on the first additional re-transmission and the first transmission, and in case that the decoding of the message is unsuccessful, transmit, to the base station, a NACK message.

In accordance with an embodiment, a node entity in a communication system, the node entity includes a transceiver and at least one processor. The at least one processor is configured to: transmit, a first additional re-transmission for a message, the first additional re-transmission being associated with at least one additional beam other than a main beam for the terminal; transmit, a first transmission for the message, the first transmission being associated with the main beam for the terminal; in case that the decoding of the message is unsuccessful, receive a NACK message.

Advantageous Effects of Invention

Advantages, and salient feature of the invention will become apparent to those skilled in the art from the following detailed description, which, taken in conjunction with the annexed drawing, discloses exemplary embodiments of the invention. According to embodiments of the present disclosure, improvements relating to multibeam multicast are provided.

BRIEF DESCRIPTION OF DRAWINGS

For a better understanding of the invention, and to show how embodiments of the same may be carried into effect, reference will now be made, by way of example only, to the accompanying diagrammatic drawings in which:

FIG. 1 shows a prior art representation of a telecommunication system;

FIG. 2 shows a representation of a telecommunication system according to an embodiment of the present disclosure;

FIG. 3 shows a representation of a HARQ process according to the prior art;

FIG. 4 shows a representation of a HARQ process according to an embodiment of the present disclosure;

FIG. 5 shows an electronic device according to embodiments of the present disclosure; and FIG. 6 shows a node entity according to embodiments of the present disclosure.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

By the term “substantially” it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general-purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

There are essentially two modes of transmission in wireless communication systems: point to point and point to multipoint. Point-to-multipoint transmission is more efficient compared to point-to-point whenever a service or an application requires the same content to be delivered to multiple users or devices at the same time. As such, point to multipoint is considered to be an important feature for 5G applications in a number of vertical sectors, namely Media & Entertainment (M&E), Public Warning (PW), Automotive (Auto) and Internet of Things (IoT). For these use cases, the number of served UEs would typically be too large to be supported using point to point transmissions.

Point to multipoint transmissions may be further split into two categories: Multicast—where the base station is aware of the mobiles that receive the service because of prior expression of interest following a service announcement; and Broadcast—where the base station transmits a service that can be received by a plurality of User Equipments (UEs), some of which have not expressed interest. In the Broadcast case, there is typically no feedback route by which the receiving UE is able to indicate successful/unsuccessful reception.

5G Multicast and Broadcast Services (5G MBS) is being standardised in Release 17 (Rel-17) of the applicable standard, where mechanisms to improve the reliability of point to multipoint transmissions are studied. One such mechanisms is the use of retransmissions. This is the first time that this has been considered for Broadcast and Multicast. Previously, Broadcast and Multicast were always transmitted without any feedback from the UE. This means that the base station was required to tailor the broadcast service to suit the weakest link that is interested in the service in the hope that this would ensure a suitable user experience for all interested UEs.

Insofar as there is any initial thinking with regard to this issue, the following operations have been discussed:

The gNodeB transmits a packet to multitude of users (many times depending on the number of sectors/beams).

The UEs that decode the packet send positive acknowledgment (ACK) (note that this is still being discussed as it is not mandatory. However, it is mandatory to know that some UEs did not receive the packet, so as to arrange a retransmission, the NACK transmission).

The UEs that did not decode the packet send negative acknowledgment (NACK).

The scheduler plans for retransmission of any packets that were not correctly decoded either using unicast or multicast.

The support of Hybrid automatic repeat request (HARQ) in a Multicast setting is a complete paradigm shift. The fact that a group common PDSCH with HARQ retransmission is used to transmit the multicast data provides some advantages and poses some difficulties. The advantages include the fact that a common content can be detected by users within a multicast area. The difficulties include the fact that one user missing the transmission or not being able to decode the received packet will require the packet to be retransmitted. All users, even those that received the packet, will need to listen to the PDCCH of the retransmission and wait for the packet to be detected by the weakest users. This represents a waste in energy and computational resources, as well as multicast delay for the whole group. Any marginal gain for the weakest users amongst all the users can represent a major gain for the group as a whole. In effect, that marginal gain for the weakest users results in greater improvements across all users.

The other paradigm shift is the use of beams from the gNB to address UEs. This means that there will be many transmissions in different beams retransmitting PDSCH.

There are many issues regarding the use of multicast transmission in the 5G telecommunication system and it is an aim of embodiments of the present invention to address this issue and to provide a solution.

According to the present invention there is provided an apparatus and method as set forth in the appended claims. Other features of the invention will be apparent from the dependent claims, and the description which follows.

According to a first aspect of the present invention, there is provided a method of performing multicast transmission in a telecommunication system comprising: a base station, gNB, transmitting a message to a plurality of User Equipments, UEs, on a plurality of beams from the base station; one of the plurality of UEs receiving the message via a main beam and one or more additional beams; the one of the plurality of UEs combining the messages received via the main beam and the one or more additional beams and decoding the message.

In an embodiment, the one or more additional beams are separated in time from the main beam and may appear before or after main beam.

In an embodiment, the main beam and the one or more additional beams are separated from each other in one or more of space and time.

In an embodiment, the one or more additional beams are temporally located before the main beam.

In an embodiment, the one or more additional beams comprise one or more beams having a received signal strength at the one of the plurality of UEs.

In an embodiment, a multicast group is defined comprising a Multi-Beam Group identifier and a further identifier specifying a beam number.

In an embodiment, a particular beam is assigned a group identifier, wherein part of the group identifier identifies one of the plurality of beams and another part of the group identifier identifies a particular multicast service.

In an embodiment, if the one of the plurality of UEs is unable to decode the message from the gNB, it transmits a NACK message to the gNB which then transmits the message again with additional redundancy coding.

In an embodiment, upon successful decoding of the message, the one of the plurality of UEs transmits an ACK message to the gNB.

According to a second aspect of the present invention, there is provided apparatus arranged to perform the method of the first aspect In an embodiment of the invention, one or more of the following features are present:

- The same content is sent across different multicast groups under different beams using different G-RNTI.
- Each UE could receive different beams with different levels of quality, but the issue is that PDCCH is not detected due to the fact that the G-RNTI is different.
- For unicast, there is no reason to send the PDSCH on weaker beams because the transmission of interest is more efficient on the main beam (that was specified as such by the UE itself)
- For multicast, however, the data that is obtained from other beams can be used to improve the reception quality.

In the prior art, re-transmission in the context of a multicast setup has not been attempted before. In an embodiment of the present invention, this is possible and permits improved performance. The chance of any particular UE transmitting ACK, rather than NACK is improved.

In the prior art, it would generally be necessary to adapt the system to the performance of the weakest link i.e. the UE getting the weakest signal. However, with an embodiment of the present invention, the system can be configured to optimise performance for the majority. Weaker users may be served by means of unicast transmissions, separate to the multicast transmissions which serve the majority.

A compromise may be reached whereby overall system performance is maximised. This may vary in case to case and may depend on factors such as the permitted latency which is acceptable.

FIG. 1 illustrates a representation of an antenna creating 8 beams (0 to 7), which are transmitted at different times and in different spatial directions, in a swept fashion. Also shown is received signal strength at two different UEs, UE1 and UE2. In each case, the maximum signal strength at the UE is associated with the beam pointed more directly at that UE-beam 1 for UE1, and beam 7 for UE2. This is indicated for the particular beam having the strongest signal strength. Weaker signals are received from beams pointed in other directions, with received signal strength generally decaying as the angle from the UE increases.

When receiving a multicast service announcement, the UE performs the Synchronization Signal Block (SSB) beam sweeping and selects more than one beam to listen to. All beams above a given threshold that allows Dedicated Physical Control Channel (DPCCH) reception should be kept, even if the signal level is not enough for Physical Downlink Shared Channel (PDSCH) reception if taken alone.

All UEs are enabled to receive DPCCH whenever the beam quality allows it. For this, the Group Radio Network Temporary Identifier (G-RNTI) per multicast group is changed into a two step process:

- A new temporary identifier Multi-Beam Group-RNTI (MBG-RNTI) is defined that covers all the users under all the beams.
- A field is added to the Downlink Control Information (DCI) of DPCCH specifying the beam number.

Another embodiment which achieves similar results to the two step process mentioned above (i.e. MBG-RNTI+A field in the DCI) is to have one group identifier (G-RNTI) per beam, but this G-RNTI will have 3 bits to define one of the 8 beams, with the remaining bits defining the multicast service. The remaining bits will be common to all beams. In this way, a UE receiving the G-RNTI can deduce the beam and the multicast service by reading the first 3 bits then the remaining bits.

With these two steps UEs interested in multibeam combining are thereby enabled to use it. At the same time, UEs that do not wish to use the combining and wish to continue using single beam HARQ can uniquely identify their multicast-group.

A further step is the use of additional transmissions, which the UE is able to use to improve signal reliability and so boost the chance of successful reception. These additional transmission may be considered as “advance re-transmissions” or redundant transmission which are sent ahead of any requested re-transmission. This is illustrated in FIG. 2, which resembles FIG. 1, but differs in that it indicates several beams which represent those offering a received signal strength at the respective UE having a stronger signal, with each UE indicating more than a single beam of interest. These additional beams (compared to FIG. 1) show neighbouring beams which may be used to improve the chances of successfully decoding a particular transmission.

This requires a new decoding method at the UE which involves combining before decoding the first transmission. In the prior art, the HARQ method involves decoding, then reporting, then combining.

A further consequence of the technique according to an embodiment of the invention is that the UE does not send an ACK/NACK until it has combined all the useful beams PDSCHs. In case of timing constraints, at least all of the beams before the main beam will be combined. To illustrate this consider UE2 in FIG. 2 where the main beam is Beam 7 and Beams 5 and 6 precede the main beam and so may be combined without delaying reception. However, in the case of UE1, the main beam is Beam 1 and to improve reception chances a preceding beam (Beam 0) and a succeeding beam (Beam 2) may be combined. However, by waiting for Beam 2, reception may be delayed. This may or may not be acceptable, depending on the particular circumstances. For instance, in the case of a low latency situation, it may not be desirable to delay reception at all. However, in a case where delay is not an issue (such as downloading a multimedia file for later playback), a delay may be tolerated.

FIG. 3 illustrates reception according to the prior art. gNB 100 transmits to UE 10. The first transmission is sent and the UE 10 attempts to decode. If successful, the UE sends an ACK to the gNB. If unsuccessful, the UE 10 sends a NACK to the gNB which then sends a 2nd transmission, which has added redundancy coding in an attempt to ensure that it is decoded. The first and second transmission include the same message content, but are encoded differently, with the second transmission including additional redundancy in an attempt to improve the chance of decoding success.

As a result of this 2nd transmission, the UE 10 performs rate matching and combining and then decodes the message. An ACK or NACK is then transmitted to the gNB 100 as appropriate.

FIG. 4 illustrates reception according to an embodiment of the present invention where gNB 200 is in communication with UE 20. In this case, before the first transmission, there is one or more additional or advance re-transmission. There are transmissions associated with beams other than the main beam directed at the UE 20. In the scenario illustrated in FIG. 2, the additional re-transmissions to UE2 are the transmissions associated with beams 5 and 6 and the so-called first transmission in FIG. 4 is the transmission associated with beam 7.

The separate transmissions from each beam are rate-matched and combined and then the message is decoded. If successful an ACK is sent to the gNB 200. If unsuccessful, then a NACK is transmitted. In the latter case, then the gNB sends a second transmission, which is a re-transmission of the first transmission. Depending on which beam (1 to 8) serves as the desired beam (i.e. the one which delivers the best signal to the UE) other beams, which may exist before or after the desired beam, will carry additional or advance re-transmissions. As such, unless the desired beam is the first or the last in the sequence, then the additional re-transmissions can exist before or after the desired beam.

As with FIG. 3, once the second transmission and second advance re-transmissions are received, these are rate-matched and combined and then decoded. An ACK or NACK is then sent back to the gNB as appropriate.

In this embodiment of the invention, all UEs in the same beam are addressed with a Group-RNTI (G-RNTI) in DPCCH. This G-RNTI will allow UEs to recognize the service and receive the upcoming PDSCH.

For this method to work effectively, the multicast groups that receive the same multicast service are addressed together. In order to do this, the following features are provided:

- Provide a multi-beam G-RNTI (MBG-RNTI) for PDCCH to enable all users to receive the PDCCH that contains the information about PDSCH.
- In order to distinguish between different groups (beams) under a common MBG-RNTI, the DCI has a field for the beam number to distinguish different beams.
- For low quality users that are interested in using this method, read the PDCCH (DCI) and listen to the PDSCH on a different beam.
- For users that are not interested or have sufficient quality, this step can be skipped (If the DCI beam indicator is different than the main beam of the UE, then don't listen to PDSCH).

This approach allows the overall group (MBG-RNTI) that is equivalent to the multicast service identifier to know if this signal is of interest to a given UE. At the same time, this provides a sub-identifier to tell which beam this identifier is for, because, not all UEs will be interested in this method and some may want or decide to make use of the prior art method of using only the best received beam because it is good enough for their purposes. This is why the first step is provided to recognize the service and the second step (DCI information) for UEs to be able to tell which beam and either use the additional or advance re-transmission or to ignore it.

By means of an embodiment of the present invention multicast service may be provided with lower latency and with less computational complexity, by enabling UEs that are on the edge of a beam to listen to more than one beam which helps to avoid requesting multiple retransmissions. This has the effect of reducing the computational complexity on other UEs as well as to reduce the delay, resulting in better performance all around.

FIG. 5 illustrates an electronic device (i.e terminal, UE 젼) according to embodiments of the present disclosure. Referring to the FIG. 5, the electronic device 500 may include a processor (or a controller) 510, a transceiver 520 and a memory 530. However, all of the illustrated components are not essential. The electronic device 500 may be implemented by more or less components than those illustrated in FIG. 5. In addition, the processor 510 and the transceiver 520 and the memory 530 may be implemented as a single chip according to another embodiment.

The electronic device 500 may correspond to electronic device described above. For example, the electronic device 500 may correspond to the terminal or the UE. The aforementioned components will now be described in detail.

The processor 510 may include one or more processors or other processing devices that control the proposed function, process, and/or method. Operation of the electronic device 500 may be implemented by the processor 510.

For example, the processor configured to receive, from a base station, a first additional re-transmission for a message, the first additional re-transmission being associated with at least one additional beam other than a main beam for the terminal, receive, from the base station, a first transmission for the message, the first transmission being associated with the main beam for the terminal, identify whether a decoding of the message is successful based on the first additional re-transmission and the first transmission, and in case that the decoding of the message is unsuccessful, transmit, to the base station, a NACK message. The processor is further configured to receive, from the base station, a second transmission for the message, the second transmission being a re-transmission of the first transmission and associated with a desired beam; and receive, from the base station, a second additional re-transmission for the message, the second additional re-transmission being associated with other beam other than the desired beam. Further, the processor is configured to transmit, to the base station, an ACK message in case that the decoding of the message is successful.

The transceiver 520 may include a RF transmitter for up-converting and amplifying a transmitted signal, and a RF receiver for down-converting a frequency of a received signal. However, according to another embodiment, the transceiver 520 may be implemented by more or less components than those illustrated in components.

The transceiver 520 may be connected to the processor 510 and transmit and/or receive a signal. The signal may include control information and data. In addition, the transceiver 520 may receive the signal through a wireless channel and output the signal to the processor 510. The transceiver 520 may transmit a signal output from the processor 510 through the wireless channel.

The memory 530 may store the control information or the data included in a signal obtained by the electronic device 500. The memory 530 may be connected to the processor 510 and store at least one instruction or a protocol or a parameter for the proposed function, process, and/or method. The memory 530 may include read-only memory (ROM) and/or random access memory (RAM) and/or hard disk and/or CDROM and/or DVD and/or other storage devices.

FIG. 6 illustrates a node entity according to embodiments of the present disclosure.

Referring to the FIG. 6, the node entity 600 may include a processor (or a controller) 610, a transceiver 620 and a memory 630. However, all of the illustrated components are not essential. The node entity 600 may be implemented by more or less components than those illustrated in FIG. 6. In addition, the processor 610 and the transceiver 620 and the memory 630 may be implemented as a single chip according to another embodiment.

The node 600 may include "gNodeB (gNB)". Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE".

The aforementioned components will now be described in detail.

The processor 610 may include one or more processors or other processing devices that control the proposed function, process, and/or method. Operation of the node entity 600 may be implemented by the processor 610.

For example, the processor is configured to transmit, a first additional retransmission for a message, the first additional re-transmission being associated with at least one additional beam other than a main beam for the terminal, transmit, a first transmission for the message, the first transmission being associated with the main beam for the terminal, and in case that the decoding of the message is unsuccessful, receive a NACK message. The processor is further configured to transmit, a second transmission for the message, the second transmission being a re-transmission of the first transmission and associated with a desired beam; and transmit, a second additional re-transmission for the message, the second additional re-transmission being associated with other beam other than the desired beam. Further, the processor is configured to receive an ACK message, in case that the decoding of the message is successful.

The transceiver 620 may be connected to the processor 610 and transmit and/or receive a signal. The signal may include control information and data. In addition, the transceiver 620 may receive the signal and output the signal to the processor 610. The transceiver 620 may transmit a signal output from the processor 610.

The memory 630 may store the control information or the data included in a signal obtained by the node entity 600. The memory 630 may be connected to the processor 610 and store at least one instruction or a protocol or a parameter for the proposed function, process, and/or method. The memory 630 may include read-only memory (ROM) and/or random access memory (RAM) and/or hard disk and/or CD-ROM and/or DVD and/or other storage devices.

Although this disclosure has been described with an exemplary embodiment, various changes and modifications may be suggested to one skilled in the art. It is intended that this disclosure encompass such changes and modifications as fall within the scope of the appended claims.

Although a few preferred embodiments of the present invention have been shown and described, it will be appreciated by those skilled in the art that various changes and modifications might be made without departing from the scope of the invention, as defined in the appended claims.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a terminal in a wireless communication system, the method comprising:

receiving, from a base station, a first additional re-transmission for a message, wherein the first additional re-transmission is associated with at least one additional beam other than a main beam for the terminal;

receiving, from the base station, a first transmission for the message, wherein the first transmission is associated with the main beam for the terminal;

identifying whether a decoding of the message is successful, based on the first additional re-transmission and the first transmission;

in case that the decoding of the message is unsuccessful, transmitting, to the base station, a negative acknowledgement (NACK) message;

receiving, from the base station, a second transmission for the message, wherein the second transmission is a re-transmission of the first transmission and is associated with a desired beam; and receiving, from the base station, a second additional re-transmission for the message, wherein the second additional re-transmission is associated with an additional beam other than the desired beam.

2. The method of claim 1, wherein the at least one additional beam is separated in time from the main beam.

3. The method of claim 2, wherein the main beam and the at least one additional beam are separated from each other in one or more of space and time.

4. The method of claim 1, wherein the at least one additional beam is located before the main beam.

5. The method of claim 1, wherein a particular beam is assigned a group identifier, wherein a part of the group identifier identifies one of a plurality of beams and another part of the group identifier identifies a particular multicast service.

6. The method of claim 1, further comprising:

in case that the decoding of the message is successful, transmitting, to the base station, an acknowledgement (ACK) message.

7. A terminal in a wireless communication system, the terminal comprising:

a transceiver, and a controller coupled with the transceiver, and configured to:

receive, from a base station, a first additional re-transmission for a message, wherein the first additional re-transmission is associated with at least one additional beam other than a main beam for the terminal, receive, from the base station, a first transmission for the message, wherein the first transmission is associated with the main beam for the terminal, identify whether a decoding of the message is successful, based on the first additional re-transmission and the first transmission, in case that the decoding of the message is unsuccessful, transmit, to the base station, a negative acknowledgement (NACK) message, receive, from the base station, a second transmission for the message, wherein the second transmission is a re-transmission of the first transmission and is associated with a desired beam, and receive, from the base station, a second additional re-transmission for the message, wherein the second additional re-transmission is associated with an additional beam other than the desired beam.

8. The terminal of claim 7, wherein the at least one additional beam is separated in time from the main beam.

9. The terminal of claim 8, wherein the main beam and the at least one additional beam are separated from each other in one or more of space and time.

10. The terminal of claim 7, wherein the at least one additional beam is located before the main beam.

11. The terminal of claim 7, wherein a particular beam is assigned a group identifier, wherein a part of the group identifier identifies one of a plurality of beams and another part of the group identifier identifies a particular multicast service.

12. The terminal of claim 7, wherein the controller is further configured to:

in case that the decoding of the message is successful, transmit, to the base station, an acknowledgement (ACK) message.

* * * * *